United States Patent
Fait et al.

[11] Patent Number: 5,785,731
[45] Date of Patent: Jul. 28, 1998

[54] PROCESS OF MAKING A NON-SAG TUNGSTEN WIRE FOR ELECTRIC LAMPS

[75] Inventors: Martin Fait; Joachim Fuchs, both of Berlin; Alfred-Georg Gahn, Koenigsbrunn, all of Germany; Hans-Joachim Lunk, Towanda, Pa.; Michael Salmen, Munich; Burkhard Ziemer, Berlin, both of Germany

[73] Assignee: Patent-Treuhand-Gesellschaft für elektrische Glühlampen mbH, Munich, Germany

[21] Appl. No.: 608,550

[22] Filed: Feb. 28, 1996

[30] Foreign Application Priority Data

Mar. 3, 1995 [DE] Germany ............... 195 07 555.2

[51] Int. Cl.$^6$ ............................................. B22F 9/24
[52] U.S. Cl. ........................... 75/368; 75/369; 75/371; 419/4; 419/63
[58] Field of Search ............... 75/351, 368, 369, 75/370, 371; 419/4, 63

[56] References Cited

U.S. PATENT DOCUMENTS 5,072,147  12/1991  Pugh et al. ............................. 313/341
5,087,299   2/1992  Fukuchi et al. ............................. 419/4

FOREIGN PATENT DOCUMENTS 1169677  5/1964  Germany ............................. 75/351

OTHER PUBLICATIONS

"The Metallurgy of Doped/Non-Sag Tungsten", edited by Erwin Pink and Laszlo Bartha, Elsevier Applied Science, London (1989), pp. 4–19, 30–35, 84–99.

"Bubbles—Chemische Untersuchungen zur Herstellung kaliumdotierter Wolframpulver für die Glühlampenproduktion" (Bubbles—Chemical Investigations Relating to the Manufacture of Potassium Doped Tungsten Powder for the Production of Incandescent Lamps, Thesis by Alfred Gahn, Ludwig–Maximilians–University, Munich, 1986.

Primary Examiner—George Wyszomierski
Attorney, Agent, or Firm—Frishauf, Holtz, Goodman, Langer & Chick, P.C.

[57] ABSTRACT

To dope ammonium paratungstate with potassium, essentially devoid of silicon and ammonium, an aqueous potassium containing solution, preferably potassium hydroxide is added to an aqueous solution of ammonium paratungstate (APW), in a mol relationship of potassium to ammonium of between 0.1 and 10. A doped ammonium potassium paratungstate (AKPW) is obtained. This ammonium potassium paratungstate is then converted to tungsten blue oxide, which is reduced, preferably in a hydrogen containing atmosphere and a tungsten powder is then obtained which will be doped with 40 to 120 ppm, preferably about 90 ppm of potassium. Lamps equipped with tungsten wire filaments drawn from so doped tungsten have lifetimes at least 10% more than lamps with conventional tungsten filaments.

10 Claims, 1 Drawing Sheet

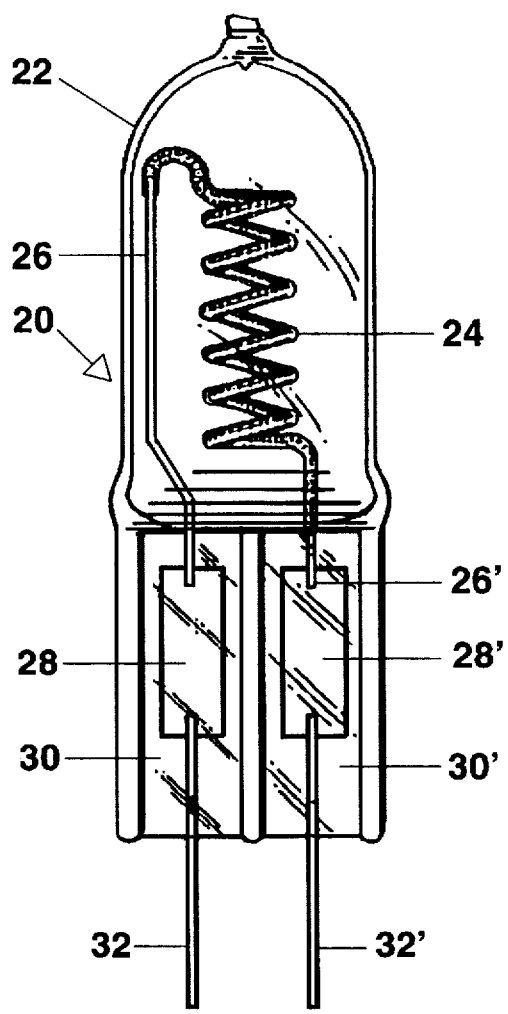

PROCESS OF MAKING A NON-SAG TUNGSTEN WIRE FOR ELECTRIC LAMPS

Reference to related application, assigned to the assignee of the present invention, the disclosure of which is hereby incorporated by reference:
U.S. application Ser. No. 08/608,552, filed Feb. 28, 1996, SALMEN et al.
Reference to related patent, the disclosure of which is hereby incorporated by reference:
U.S. Pat. No. 5,072,147, Pugh et al.
Reference to related publications:
"The Metallurgy of Doped/Non-Sag Tungsten", edited by Erwin Pink and Laszlo Bartha, Elsevier Applied Science, London (1989).
"BUBBLES", "Chemische Untersuchungen zur Herstellung kaliumdotierter Wolframpulver für die Glühlampenproduktion" ("BUBBLES—Chemical Investigations Relating to the Manufacture of Potassium Doped Tungsten Powder for the Production of Incandescent Lamps"), Thesis by Alfred Gahn, Ludwig-Maximilians-University, Munich, 1986, the low solubility of potassium in alpha tungsten. The doped tungsten blue oxide is then reduced with hydrogen to tungsten powder. The tungsten powder is then compacted by compression, sintering, swaging and drawing. Drawing processes can work down tungsten wire to diameters of about 15 μm for use in coiled filaments. The doping content of the wire will then be about 100 to 160 ppm potassium, 120 to 220 ppm silicon and 50 to 80 ppm aluminum.

It is well known, and also referred to in the above publication "The Metallurgy of Doped/Non-Sag Tungsten" to precipitate tungsten acid $WO_3 \cdot H_2O$ already doped, from a solution of potassium-sodium-silicate and potassium-sodium-tungstate by means of HCl.

Tungsten blue oxide is defined, essentially, by a hexagonal ammonium tungsten bronze (abbreviated AWB), having a composition of $(NH_4)_x WO_{3-x}$, wherein x=0.05 to 0.1, see, particularly, the article "BUBBLES—Chemische Untersuchungen zur Herstellung kaliumdotierter Wolframpulver für die Glühlampenproduktion" ("BUBBLES—Chemical Investigations Relating to the Manufacture of Potassium Doped Tungsten Powder for the Production of Incandescent Lamps"), Thesis by Alfred Gahn, Ludwig-Maximilians-University, Munich, 1986, particularly pages IX–XII and pages 1–24. Another representation of tungsten blue oxide is $xNH_3 \cdot yH_2O \cdot WO_n$. The blue oxide, besides the AWB, may also contain portions of $WO_3$, and further $W_{20}O_{58}$, and other oxides. The quantity of the additives frequently added by solutions, with respect to the tungsten content of the blue oxide is typically about 2,500 ppm/W for potassium, about 1,500 ppm/W for silicon and about 500 ppm/W for aluminum. The additive effect or doping effect, respectively, influences the reduction and sinterkinetic processes, but controls, primarily, the recrystallization processes of doped tungsten wires. These recrystallization processes lead to the formation of a structure with, with respect to the wire diameter, elongated crystallites (about 15 to 25 times as long as the wire diameter) which overlap and interlock at grain boundaries. This structure, which can be termed a stacked or shingled structure, is characterized by inhibiting the movement transversely to the axis of the wire of the grain boundaries. The interlocking of the crystallites prevents the mutual offsetting. The stacked structure is a true microalloy which contains the technologically effective alloying component, the metallic potassium, in the region of a trace concentration of up to about 120 ppm. In a wire, the potassium is in form of bubbles in rows along the grain boundaries, similar to a string of pearls. They have diameters of a few nanometers to micrometers, and control the recrystallization behavior. It appears that the interlocking of the crystallites provides for form or shape stability at the operating temperature and results in the required mechanical strength, that is, provides for non-sag, or at least low-sag quality.

The tungsten blue oxide which results from thermal decomposition of ammonium paratungstate tetrahydrate (APW) in a reducing atmosphere does not represent a uniform phase, but rather a mixture of varied portions of hexagonal ammonium tungsten bronze, tungsten (VI) oxide, tungsten suboxides, as well as substantial proportions of X-ray amorphous components. It has been found that the separate components of the tungsten blue oxide, when individually isolated for experimental purposes, differ substantially in their characteristics regarding suitability for doping. Consequently, tungsten blue oxides of different compositions will respond differently to doping and have different doping results with respect to concentration of potassium.

FIELD OF THE INVENTION

The present invention relates to a method to make a non-sag, and essentially non-vibrating tungsten wire for use in heat and light-radiating devices, typically incandescent lamps, heat lamps and the like, to a wire made by the process, and lamps utilizing such a wire.

BACKGROUND

The referenced U.S. Pat. No. 5,072,147, Pugh et al. describes tungsten wires for use in incandescent lamps. The tungsten wire which is used in the filament of the incandescent lamps is subject to high mechanical loading and stresses, and especially when it is used in lamps or high-temperature radiators having an operating temperature of about 3,000° C. Tungsten wires are made, in principle, in various stages in accordance with the well-known Coolidge method, according to which a decomposed ammonium paratungstate, also known as tungsten blue oxide is made. The referenced literature "The Metallurgy of Doped/Non-Sag Tungsten", edited by Erwin Pink and Laszlo Bartha, Elsevier Applied Science, London (1989), and especially pages 4–12, 31–34 and 85–95, describes how, first, ammonium paratungstate is obtained from tungsten ore and which, thereafter, by heating in hydrogen and/or nitrogen, is decomposed to tungsten blue oxide.

Pure tungsten wire, as is known, is not suitable to make filaments for incandescent lamps, heat lamps and the like. After only short operating time, individual pieces of the filament coil have the tendency to offset, or slide off with respect to each other. A lamp having such filaments will therefore fail prematurely. To prevent offsetting, it has been proposed to dope the blue tungsten oxide with solutions containing potassium, aluminum, and silicon; particularly, potassium silicate and aluminum nitrate or aluminum chloride doping solutions were used. Direct doping of tungsten with potassium is not possible due to A disadvantage of known processes is the non-homogeneous distribution of the doping components potassium, aluminum and silicon, caused, for example, by local formation of crusts, due to the doping compounds. The doping elements silicon and aluminum, which are used in combination with potassium, result in a high loading of the tungsten matrix and, when they vaporize during sintering, at temperatures of about 2,600° C. of the sintering process, nearly completely leave the tungsten matrix. After sintering, only a few percent of the doping elements remains in the tungsten.

THE INVENTION

It is an object of the present invention to provide a method which results in tungsten wires, particularly suitable for coiled and coiled-coil filaments for electric lamps, for example incandescent lamps, heat lamps and lamps equipped with wires which are made by the improved process.

Briefly, a doping agent formed by an aqueous potassium-containing solution is added to an aqueous solution of ammonium paratungstate (APW), and the resultant doped solution, which is an ammonium potassium paratungstate solution is then converted to tungsten blue oxide. The molecular relationship or mole ratio of potassium to ammonium is between 0.1 and 10, to form the ammonium potassium paratungstate (AKPW). Preferably, special hexagonal ammonium potassium tungsten bronzes are formed as a major portion of the tungsten blue oxide. It is particularly desirable to provide for the presence of potassium polytungstate in the tungsten blue oxide by adding a sufficiently high amount of potassium hydroxide to the ammonium potassium monotungstate solution. Other compounds, for example potassium nitrate or chloride, can be used instead of potassium hydroxide.

Doping the tungsten in this manner permits introducing the critical element of potassium alone, and thus avoids the detour of doping with other components as well. Doping of the blue oxide itself is not needed.

The tungsten powder is essentially devoid of silicon and aluminum. It is possible that some minor residual contaminants of these substances are present, usually in an order of magnitude of at the most about 30 ppm. They may occur as a contaminant to the potassium; the quantity of potassium is not thereby affected.

The process in accordance with the invention results in homogeneous distribution of the potassium in a tungsten sinter rod, and also results in decreased stressing or doping of the tungsten matrix by the foreign elements of silicon and aluminum during sintering, rolling, swaging and drawing. Thus, the material characteristics of the tungsten wire suitable for electrical lamp filaments is substantially improved; it results in effective high-temperature stability of the wire which leads to long lifetime of lamps in which the wires are used.

BRIEF DESCRIPTION OF THE DRAWING

The single figure is a highly schematic side view of an incandescent lamp having a filament in accordance with the present invention.

DETAILED DESCRIPTION

Homogeneous distribution of potassium in the tungsten powder is obtained, in accordance with the present invention, by adding potassium already in the process of ammonia paratungstate crystallization of the aqueous ammonia-containing monotungstate solution. The potassium is added, in form of a potassium-containing solution, preferably in the form of a potassium hydroxide solution, in proportion to the ammonium in a quantity of between about 0.1 to 10 times. The crystallization products which are obtained are then ammonium-potassium paratungstate mixed crystals (AKPW) of the type $$(NH_4)_{10-x}K_x[H_2W_{12}O_{42}] \cdot nH_2) \quad \ldots (1)$$

wherein x is between 0 and 10 and n is between 4 and 10, or, mathematically ($0<x<10$; $4 \leq n \leq 10$). Preferably x is between 1.1 and 6.8.

The coefficient x can be termed a "portion factor". Reduction of these AKPW crystals in pure hydrogen leads to the formation of tungsten blue oxide. Portion factor x corresponding to the selected relationship between ammonium and potassium determines the composition of the tungsten blue oxide. The resulting tungsten blue oxide will have a phase mixture of the following composition:

Range I, corresponding to portion factor $0 \leq x \leq 0.6$; 85 to 95% crystalline portions, 50 to 80% hexagonal ammonium potassium tungsten bronze of the composition $M_yWO_3$, wherein M is at least one of $NH_4$ and K and $y \leq 0.22$; 5 to 15% X-ray amorphous portions;

Range II, corresponding to a portion factor $0.6<x<1.6$; a mixture of hexagonal ammonium-potassium tungsten bronze, tungsten oxide, and hexagonal potassium polytungstate; small presence of X-ray amorphous portions;

Range III, corresponding to portion factor $1.6 \leq x \leq 3.2$; 100% crystalline portion: a mixture of hexagonal ammonium-potassium tungsten bronze and hexagonal potassium polytungstate;

Range IV, corresponding to a portion factor $3.2<x<10$; 80% crystalline portion: a mixture of hexagonal tungsten bronze and hexagonal potassium polytungstate; 20% X-ray amorphous parts.

The formation of ammonium-potassium tungsten bronze, and as a particularly desirable embodiment, the formation of potassium polytungstate rather than tungsten oxide, each with hexagonal structure, is the basis for homogeneous distribution of potassium in the tungsten oxide matrix.

The second step of the reduction of tungsten blue oxide, in a hydrogen atmosphere, leads to the formation of pulverized or powder α-tungsten which, with increasing content of potassium in the AKPW mixed crystals, contains increasing portions of potassium monotungstate, $K_2WO_4$. By treatment with water, the potassium monotungstate is completely removed. The content of potassium in the reduced tungsten powders, which are additionally treated with diluted HCl, or reduced HF is between about 40 to 120 ppm, preferably about 90 ppm.

The single figure illustrates, highly schematically, a halogen incandescent lamp having a coiled-coil tungsten filament made in accordance with the present invention. The invention, of course, is applicable to many other types of lamps as well, the particular lamp being selected merely for purposes of illustration.

The lamp 20 has a quartz glass envelope 22 containing two pinch-sealed in leads having outer terminal portions 32, 32', inner terminal leads 26, 26', connected to opposite ends of intermediate molybdenum sealing foils 28, 28', respectively. A compact coiled-coil tungsten filament 24, made according to the invention, is attached to one end to inner lead 26 and at the other to inner lead 26'. The leads are connected to the molybdenum sealing foil by suitable means, such as welding. Leads 26 and 26' are made of molybdenum. The envelope 22 contains a fill of a mixture of noble gas, hydrogen and a halogen compound, such as chlorine bromide, and, optionally, nitrogen, hydrogen and a getter such as phosphorus.

In operation, the filaments are heated to temperatures of over 2,300° C.; the higher the temperature, the more light output for any given power input. In stage and studio lights, the filaments are operated at substantially higher temperatures, for example 2,900° C. and even higher, for example up to 3200° C.

EXAMPLE

An example of the process of the invention is as follows: One starting material is an aqueous ammonium-containing monotungstate solution. A potassium hydroxide solution is added. The mol relationship of potassium to ammonium is about 1:3. Consequently, the portion factor x=2.5.

Reduction is carried out in pure hydrogen, in a horizontal reduction furnace under these conditions:

| | |
|---|---|
| initial quantity: | about 15 g AKPW |
| deposition height: | about 8 mm |
| flow rate of $H_2$: | 0.8 liter per minute |
| temperature rise rate: | 3 K/min. |
| final temperature: | 410° C. |
| starting temperature: | room temperature |

A tungsten blue oxide (WBO) of a 100% crystalline mixture of hexagonal ammonium potassium tungsten bronze and hexagonal potassium polytungstate is obtained. The reduction of the tungsten blue oxide is done under the following (experimental) conditions:

| | |
|---|---|
| initial quantity: | about 7.5 g tungsten blue oxide (WBO) |
| deposition height: | about 4 mm |
| flow rate of $H_2$: | 0.8 l/min. |
| temperature rise rate: | 5 K/min; |
| final temperature: | 850° C. |
| starting temperature: | room temperature |

Tungsten powder is obtained which, initially, still contains potassium monotungstate. Further treatment of such a tungsten powder results in a tungsten wire which has about 90 ppm potassium. Remaining contaminants of silicon and aluminum are, in both cases, below 10 ppm.

An incandescent lamp having filament wires of this type will have a lifetime of at least 10% longer than lamps supplied with conventional wires of the type described hereinbefore under "Background".

Further examples can be obtained in a similar way. The starting material, again, is an aqueous ammonium containing monotungstate solution, and a potassium hydroxide solution is added thereto. Thus a mol relationship between potassium and ammonium can be defined.

In a specific embodiment (i) the mol relationship of potassium to ammonium is about 1:19, and x is 0.5.

In another embodiment (ii) the mol relationship of potassium to ammonium is about 1:6.5, and x is 1.4.

In a still further embodiment (iii) the mol relationship of potassium to ammonium is about 1:1.2, and x is 4.5.

Reduction to tungsten blue oxide and then to tungsten powder is carried out under similar conditions as in the above mentioned embodiment.

Reduction of the AKPW to the tungsten blue oxide is generally carried out under the following conditions: final temperature of 390° to 420° C., preferably 405° to 415° C. The temperature rise rate may vary between 1 and 5 K per minute. The flow rate of $H_2$ may vary between 30 and 70 l/h.

Likewise, reduction of the tungsten blue oxide to tungsten powder may be carried out under the following conditions:

final temperature of 800° to 950° C., preferably 830° to 870° C. The temperature rise rate may vary between 2 and 7 K per minute. The flow rate of $H_2$ may vary between 30 and 70 l/h.

Generally the content of potassium depends on the purpose for which the tungsten wire is intended.

The doping according to range I might be insufficient for many purposes since the grain structure is not sufficiently modified. On the other hand, doping with high amounts as in range IV might result in wasting of potassium because potassium tungstate ($K_2WO_4$) is generated which cannot be incorporated into the tungsten grid structure and will, at least partially, be removed during further manufacturing steps.

We claim:

1. A method of making a non-sag tungsten wire comprising the steps of:

(a) providing an aqueous solution of ammonium paratungstate;

(b) adding aqueous potassium hydroxide solution to the aqueous solution of ammonium paratungstate as a doping substance, wherein the mole ratio of potassium to ammonium is 0.1 to 10, thereby forming an ammonium potassium paratungstate;

(c) converting the ammonium potassium paratungstate to potassium-doped tungsten blue oxide;

(d) reducing the doped tungsten blue oxide to doped tungsten powder; and (e) compacting the doped tungsten powder and drawing doped tungsten wire from the compacted powder.

2. The method claim 1, wherein the ammonium potassium paratungstate is of the formula $$(NH_4)_{10-x}K_x(H_2W_{12})_{42})\cdot nH_2O$$

wherein x is defined as follows: $0<x<10$, and n is defined as follows: $4 \leq n \leq 10$.

3. The method of claim 2, wherein x is defined as follows: $0 \leq x \leq 0.6$.

4. The method of claim 2, wherein x is defined as follows: $0.6<x<1.6$.

5. The method of claim 2, wherein the portion factor x is defined as follows: $1.6 \leq x \leq 3.2$.

6. The method of claim 2, wherein x is defined as follows: $3.2<x<10$.

7. The method of claim 1, wherein the step of converting the ammonium potassium paratungstate to tungsten blue oxide is carried out by dissociation in a pure hydrogen atmosphere.

8. The method of claim 7, wherein the dissociation is carried out at conditions which result in a tungsten blue oxide-ammonium potassium tungsten bronze of the composition:

$$M_yWO_3,$$

wherein M is at least one of $H_4$ and K, and $y \leq 0.22$.

9. The method of claim 8, wherein the tungsten blue oxide additionally contains potassium polytungstate.

10. The method of claim 1, wherein said step of drawing a tungsten wire includes drawing a lamp filament wire.

* * * * *

UNITED STATES PATENT AND TRADEMARK OFFICE
CERTIFICATE OF CORRECTION

PATENT NO. : 5,785,731
DATED : July 28, 1998
INVENTOR(S) : FAIT et al

It is certified that error appears in the above-identified patent and that said Letters Patent is hereby corrected as shown below:

Column 6, line 35 (claim 2, line 3),

> change "$W_{12})_{42})$" to --$W_{12}O_{42})$--.

Signed and Sealed this

Twenty-seventh Day of February, 2001

Attest:

NICHOLAS P. GODICI

Attesting Officer     Acting Director of the United States Patent and Trademark Office